United States Patent
Lee

(10) Patent No.: US 9,759,878 B2
(45) Date of Patent: Sep. 12, 2017

(54) OPTICAL MODULE

(71) Applicant: ELECTRONICS AND TELECOMMUNICATIONS RESEARCH INSTITUTE, Daejeon (KR)

(72) Inventor: Jong Jin Lee, Gwangju (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/835,134

(22) Filed: Aug. 25, 2015

(65) Prior Publication Data

US 2016/0209609 A1 Jul. 21, 2016

(30) Foreign Application Priority Data

Jan. 15, 2015 (KR) .................. 10-2015-0007148

(51) Int. Cl.
G02B 6/26 (2006.01)
G02B 6/42 (2006.01)

(52) U.S. Cl.
CPC .......... G02B 6/4274 (2013.01); G02B 6/428 (2013.01); G02B 6/4245 (2013.01); G02B 6/4249 (2013.01); G02B 6/4281 (2013.01)

(58) Field of Classification Search
CPC .................................................. G02B 6/4281
See application file for complete search history.

(56) References Cited

U.S. PATENT DOCUMENTS 5,027,256 A * 6/1991 Abnoosi ............... H01F 27/027
336/65
5,583,435 A * 12/1996 Takemoto ............... G07F 17/34
273/121 A
6,525,623 B2 * 2/2003 Sridharan ............... H01P 3/081
333/128

(Continued)

FOREIGN PATENT DOCUMENTS

EP        0 893 861 A2    1/1999
JP        2007004027    * 1/2007 ............... G09F 9/00

(Continued)

OTHER PUBLICATIONS

European Search Report for European Application No. EP 0 893 861 A3, dated Jan. 12, 2000.

(Continued)

*Primary Examiner* — Uyen Chau N Le
*Assistant Examiner* — Chris Chu
(74) *Attorney, Agent, or Firm* — Kile Park Reed & Houtteman PLLC

(57) ABSTRACT

An optical module includes: a circuit board having a surface in which an electronic element is mounted; an optical waveguide array in which a plurality of optical waveguides are formed; an optical element in which an optical signal that is transmitted and received from and to the optical waveguide is input and that is mounted at a side surface of the circuit board; and a connection member that connects the optical element and the electronic element, wherein a connection portion of a side surface of the circuit board in which the connection member is received has a curved shape.

4 Claims, 4 Drawing Sheets

(56) References Cited

U.S. PATENT DOCUMENTS

| | | |
|---|---|---|
| 6,874,952 B2 | 4/2005 | Nishimura |
| 8,723,283 B2 | 5/2014 | Kang et al. |
| 2002/0085816 A1 | 7/2002 | Nishimura |
| 2004/0159777 A1* | 8/2004 | Stone .................. G02B 6/4206 250/216 |
| 2005/0053380 A1 | 3/2005 | Kim et al. |
| 2005/0141823 A1 | 6/2005 | Han et al. |
| 2010/0284647 A1* | 11/2010 | Stevenson ............ G02B 6/4249 385/14 |
| 2013/0257682 A1* | 10/2013 | Yoshida ................... H01P 3/08 343/905 |
| 2014/0147085 A1 | 5/2014 | Lim |
| 2015/0241649 A1* | 8/2015 | Chou .................... G02B 6/428 385/89 |

FOREIGN PATENT DOCUMENTS

| | | |
|---|---|---|
| KR | 10-0446161 | 8/2004 |
| KR | 10-0583646 | 5/2006 |
| KR | 10-1256814 | 4/2013 |
| KR | 10-2014-0066636 | 6/2014 |
| WO | 2011/145785 | 11/2011 |

OTHER PUBLICATIONS

Mitsuo Usui et al., "ParaBIT-1: 60-Gb/s-Throughput Parallel Optical Interconnect Module"; 2000 Electronic Components and Technology Conference; 2000; pp. 1252-1258.

* cited by examiner

OPTICAL MODULE

CROSS-REFERENCE TO RELATED APPLICATION

This application claims priority to and the benefit of Korean Patent Application No. 10-2015-0007148 filed in the Korean Intellectual Property Office on Jan. 15, 2015, the entire contents of which are incorporated herein by reference.

BACKGROUND OF THE INVENTION (a) Field of the Invention

The present invention relates to an optical module. More particularly, the present invention relates to an optical module that transfers an electric signal that is generated according to an applied optical signal to a circuit board.

(b) Description of the Related Art

In general, in a low speed system, a connection between circuit boards and between chips or between systems is performed through a metal electrical cable. However, as in a next generation information communication system that is formed with a large capacity parallel computer or an ATM switching system having a capacity of 1 Tb/s or more, as a large amount of information is transmitted and transmission speed is improved, when using such a metal cable, an electrical problem such as skew and electromagnetic interference (EMI) occurs and thus operation efficiency of the system is deteriorated and it is difficult to integrate a system.

Therefore, technology that performs an optical connection using an optical transmitting/receiving module has been developed, and a method of directly coupling an optical receiving element to a ribbon optical fiber multichannel optical connector having a reflector that is located with a tilt angle of 45° with an optical coupling method within the optical transmitting/receiving module, a method of coupling an optical transmitting/receiving element to a polymer optical waveguide having a reflector that is located with a tilt angle of 45° and connecting the polymer optical waveguide to a multichannel optical connector, a method of vertically coupling an optical transmitting/receiving element to a polymer optical waveguide and connecting the polymer optical waveguide to a multichannel optical connector, and a method of vertically coupling an optical transmitting/receiving element that is fixed to a plastic package to a multichannel optical connector are used. In this case, as an optical transmitting element, i.e., an optical source, a Vertical Cavity Surface Emitting Laser (VCSEL) array is used, and as optical receiving element, i.e., an optical detector, a photodiode (PD) array is used.

A conventional optical module reflects light that is oscillated through a light emitting port by 90° by an optical waveguide and transfers the light to an optical fiber that is connected to an optical connector along a core that is formed in a board. "ParaBIT-1: 60-Gb/s-Throughput Parallel Optical Interconnect Module, presenter: N. Usui" that was published in ECTC 2000 in May of 2000 has a structure in which a 24 channel polymer waveguide film in which a plane reflector is located with a tilt angle of 45° and a 24-optical fiber BF connector are connected, and the waveguide film and the connector are manually assembled.

In this technology, because a method of coupling an optical transmitting/receiving element to a polymer optical waveguide having a reflector that is located with a tilt angle of 45° and connecting a polymer optical waveguide to a multichannel optical connector may relatively easily form a reflector and house an optical coupler, an optical switch, and a Wavelength Division Multiplexing (WDM) element in a polymer optical waveguide, the method can extend a function of an entire module and is thus evaluated as a very effective method.

However, in order to produce an optical transmitting/receiving module for parallel optical connection having an extending function, when using the optical coupling technology, even if a small misalignment occurs in coupling of the optical transmitting/receiving element and an optical fiber, a large optical coupling loss occurs and thus satisfactory efficiency is not obtained. Therefore, structure enhancement of an optical transmitting/receiving module for parallel optical connection that can minimize a coupling loss is urgently requested.

SUMMARY OF THE INVENTION

The present invention has been made in an effort to provide an optical module having advantages of being capable of preventing a loss such as optical coupling efficiency reduction and a loss of bandwidth occurring due to rapid direction conversion of an electric signal line when transmitting a high speed signal.

An exemplary embodiment of the present invention provides an optical module including: a circuit board having a surface in which an electronic element is mounted; an optical waveguide array in which a plurality of optical waveguides are formed; an optical element in which an optical signal that is transmitted and received from and to the optical waveguide is input and that is mounted at a side surface of the circuit board; and a connection member that connects the optical element and the electronic element, wherein a connection portion of a side surface of the circuit board in which the connection member is received has a curved shape.

The connection member may be curvedly formed along a curved shape of a connection portion of a side surface of the circuit board.

A connection portion of a curved shape of a side surface of the circuit board may be formed with a rod that is made of glass.

The glass rod may have a cross-sectional shape of a quarter of a circle.

The optical element may be formed in a direction opposite to that of the electronic element in the circuit board, and the glass rod may be installed at a side surface of the circuit board.

The connection member may include a transmission line, and a wire bonding unit that connects the electronic element and the optical element at both ends of the transmission line.

The transmission line may be formed in a pattern in the glass rod.

An optical module according to an exemplary embodiment of the present invention can simplify a production process by forming a transmission line in a glass rod.

Further, by minimizing a loss of an electric signal by forming a curved surface using a glass rod, a bandwidth can be extended and various angles of transmission line can be implemented.

DETAILED DESCRIPTION OF THE EMBODIMENTS

Figure 1:
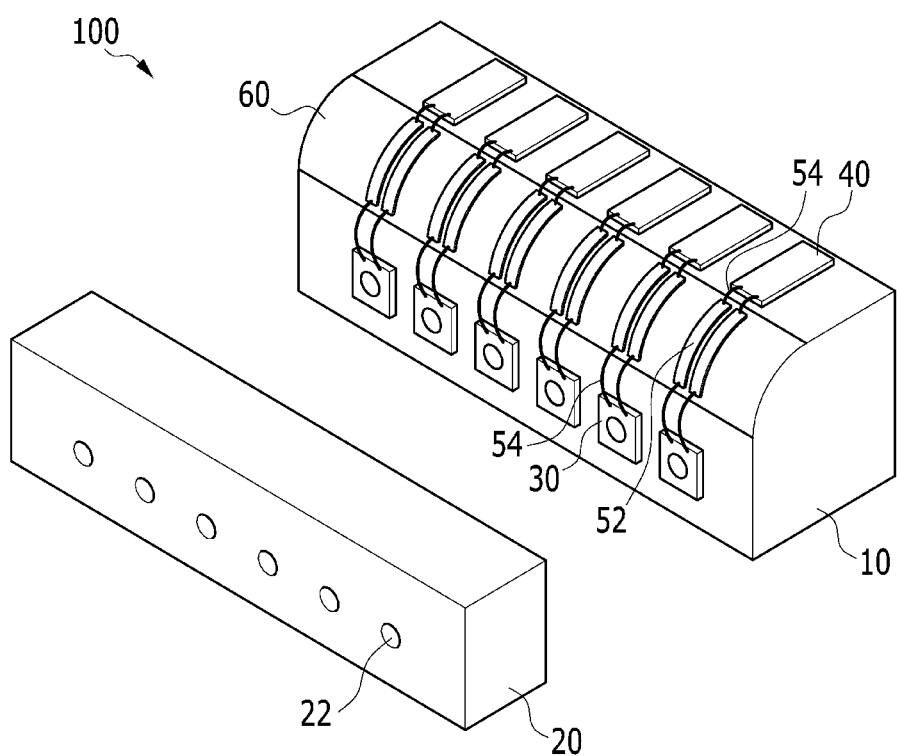
FIG. 1 is a perspective view illustrating an optical module according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Further, in the drawings, a size and thickness of each element are randomly represented for better understanding and ease of description, and the present invention is not limited thereto.

In addition, unless explicitly described to the contrary, the word "comprise" and variations such as "comprises" or "comprising" will be understood to imply the inclusion of stated elements but not the exclusion of any other elements.

FIG. 1 is a perspective view illustrating an optical module according to a first exemplary embodiment of the present invention.

Referring to FIG. 1, a circuit board 10 in which a plurality of electronic elements 40 and an optical element 30 are mounted and an optical waveguide array 20 in which a plurality of optical waveguides 22 are connected are coupled to form an optical module 100. The plurality of optical waveguides 22 are arranged parallel to the optical element 30 and an optical signal is input thereto, and a signal that is generated in the optical element 30 is transferred to the electronic element 40 through a connection member 50.

The optical waveguide array 20 is installed at a side surface of the circuit board 10, and a guide unit may be formed to not separate from a predetermined location.

In the optical waveguide array 20, a plurality of optical elements 30 are mounted at a side surface of the circuit board 10 to correspond to the plurality of optical waveguides 22.

The electronic element 40 is mounted at an upper surface of the circuit board 10, and is connected to the optical element 30 that is mounted at a side surface of the circuit board 10 with the connection member 50. The connection member 50 may be formed with a transmission line 52 and a wire bonding unit 54. The transmission line 52 is located between the electronic element 40 and the optical element 30, and the transmission line 52, the electronic element 40, and the optical element 30 are connected by the wire bonding unit 54. Therefore, the transmission line 52 is located between a side surface and an upper surface of the circuit board 10, i.e., at a corner of the circuit board 10.

A corner of the circuit board 10 in which the transmission line 52 is located may be a curvedly formed curved surface 60. When the transmission line 52 is located at a vertically formed surface, if an electric signal is transferred to the electronic element 40 along the transmission line 52 that is located at the curved surface 60, a loss of an electric signal or heat occurring on the transmission line 52 can be reduced.

Figure 2:
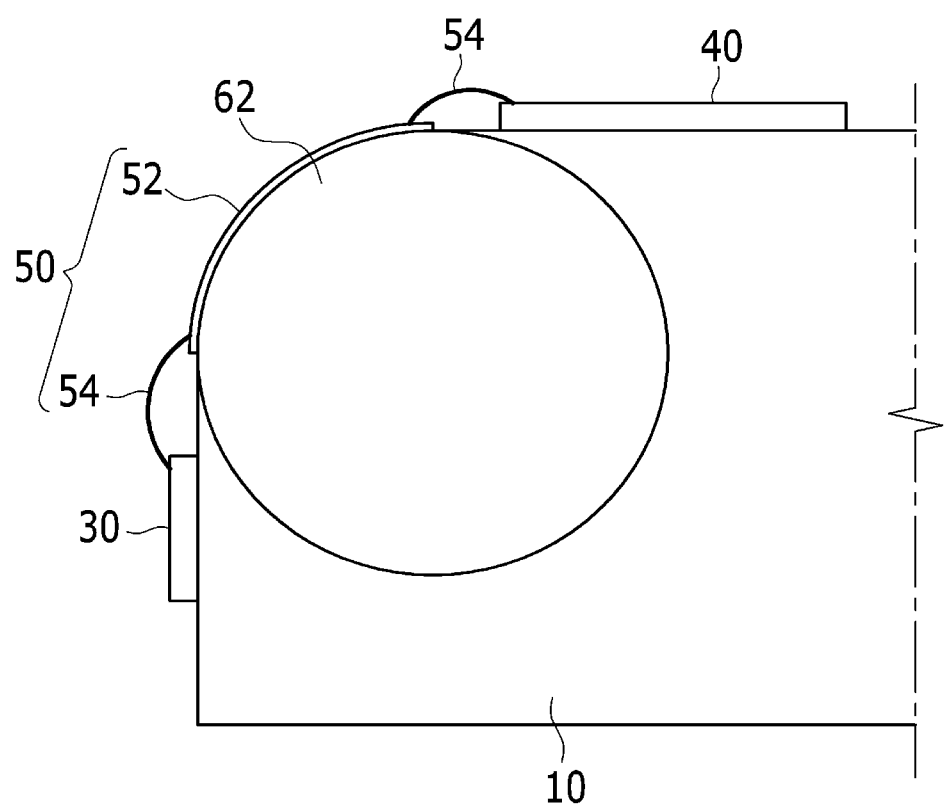
FIG. 2 is a cross-sectional view illustrating a portion of an optical module according to a first exemplary embodiment of the present invention.

FIG. 2 is a cross-sectional view illustrating a portion of an optical module according to a first exemplary embodiment of the present invention.

Referring to FIG. 2, the transmission line 52 is located at a curvedly formed corner of the circuit board 10, and a glass rod 62 is inserted into the curvedly formed curved surface 60 of the circuit board 10 to form a curved shape. A description of the configuration of the optical cable array 20 will be omitted.

The glass rod 62 is inserted into a corner portion of the circuit board 10, and the transmission line 52 is located at a surface of the glass rod 62. The glass rod 62 may function as a dielectric material.

After coating an electrode at the glass rod 62, the transmission line 52 may form a transmission line in a pattern in the glass rod 62 using infrared ray short pulse laser.

In more detail, in the transmission line 52, titanium, nickel, or chrome having good adhesion with the glass rod 62 is used, and the transmission line 52 may be plated with a method such as Au sputtering or Au plating. Further, according to a bandwidth of the transmission line 52 and a line width and a line gap that are determined according to an impedance matching structure such as a coplanar waveguide and a microstrip line, the transmission line 52 may be produced using a short pulse laser having a pulse width of several nanoseconds (ns) of an infrared ray wavelength band of 1064 nm or more having good transmittance and a low absorption rate to glass.

When the transmission line 52 is produced in this way, damage is reduced in the glass rod 62 that performs a dielectric material function and thus an impedance change of the transmission line 52 is minimized, thereby reducing a signal loss and noise.

Further, because the transmission line 52 may be directly formed in the glass rod 62 without separate mask production, cost can be reduced and a path can be smoothly changed through the transmission line 52 that is disposed along a circumference of the glass rod 62 and thus a bandwidth loss can be minimized. Further, by simplifying a production process, an optical module can be formed with a low price. Further, the signal transmission line 52 of various angles can be implemented according to a shape of the glass rod 62 and an electrode.

Figure 3:
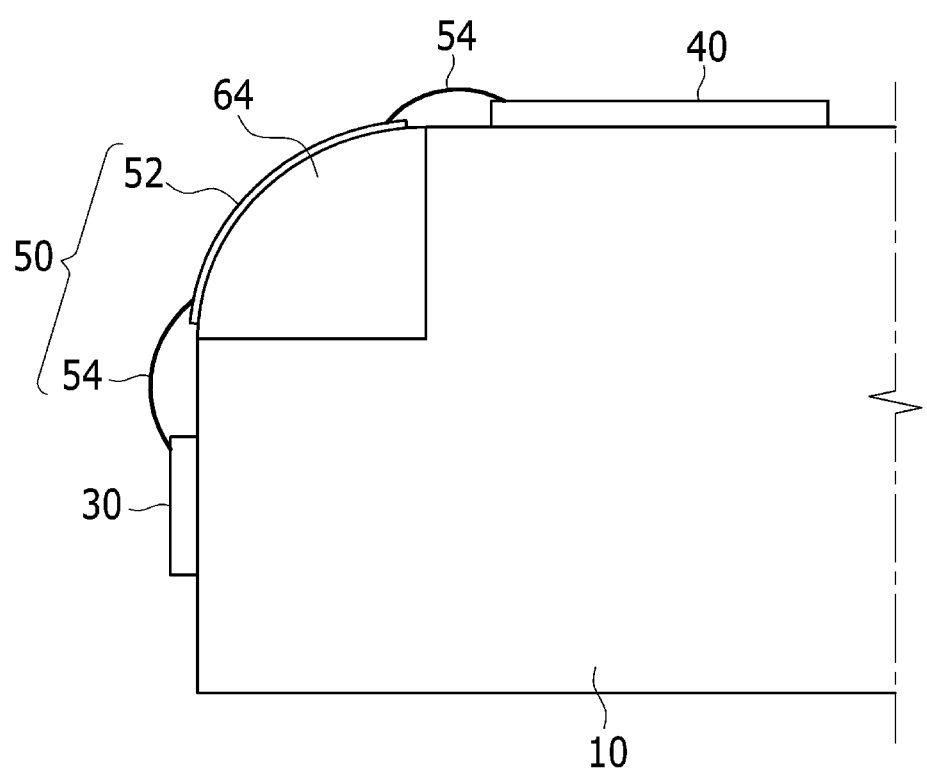
FIG. 3 is a cross-sectional view illustrating a portion of an optical module according to a second exemplary embodiment of the present invention.

FIG. 3 is a cross-sectional view illustrating a portion of an optical module according to a second exemplary embodiment of the present invention.

Referring to FIG. 3, a quarter of a glass rod 64 is inserted into a corner of a circuit board 10. The corner of the circuit board 10 is vertically formed, and the quarter of the glass rod 64 is coupled to the corner of the circuit board 10. Therefore, the optical module according to a second exemplary embodiment has a merit that the quarter of the glass rod 64 can be easily inserted into the circuit board 10 and that an optical module 100 can be formed in a small size, compared with the optical module 100 of the first exemplary embodiment.

Figure 4:
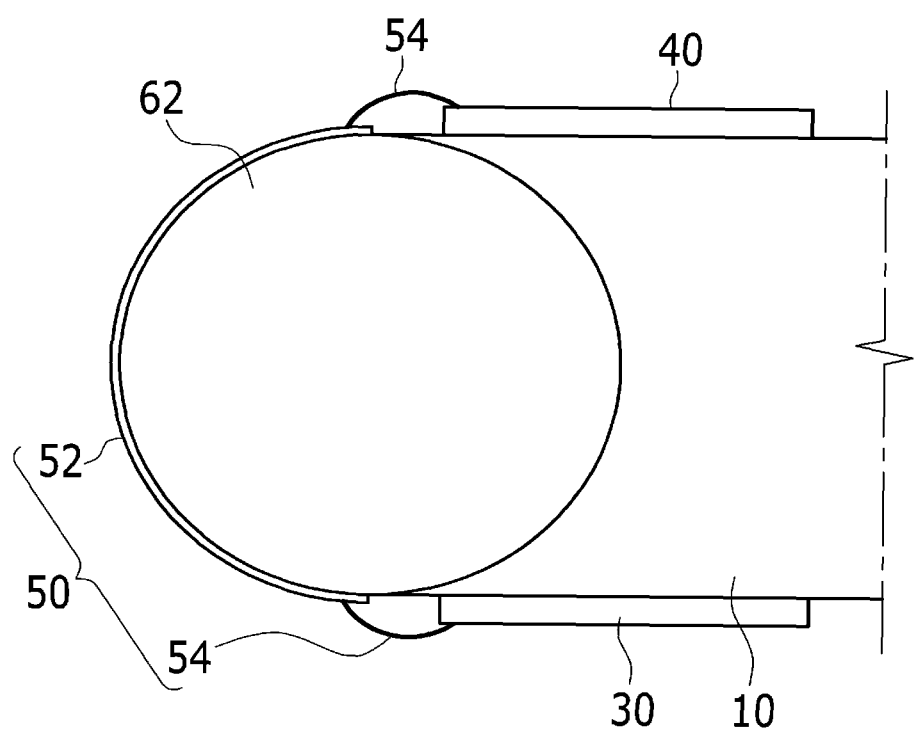
FIG. 4 is a cross-sectional view illustrating a portion of an optical module according to a third exemplary embodiment of the present invention.

FIG. 4 is a cross-sectional view illustrating a portion of an optical module according to a third exemplary embodiment of the present invention.

Referring to FIG. 4, a glass rod 62 is inserted into a side surface of a circuit board 10, an electronic element 40 is located at an upper surface of the circuit board 10, and an optical element 30 may be located at a lower surface of the circuit board 10, which is a direction opposite to that of the electronic element 40.

The optical element 30 is located at a lower surface of the circuit board 10. Therefore, because the optical element 30 may receive an input of an optical signal at a lower surface of the circuit board, the optical waveguide array 20 (see FIG. 1) and the circuit board 10 can be variously connected. By inserting the glass rod 62 into a side surface of the circuit board 10, the optical module can be easily produced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
|---|---|
| 100: optical module | 10: circuit board |
| 20: optical waveguide array | 22: optical waveguide |
| 30: optical element | 40: electronic element |
| 50: connection member | 52: transmission line |
| 54: wire bonding unit | 60: curved surface |
| 62: glass rod | 64: quarter of glass rod |

What is claimed is:

1. An optical module, comprising:
   a circuit board having an upper surface in which an electronic element is mounted and an edge having an opening inwardly formed;
   a glass rod inserted into the opening of the circuit board;
   an optical waveguide array in which a plurality of optical waveguides are formed;
   an optical element in which an optical signal that is transmitted and received from and to the optical waveguide is input and that is mounted at a lower surface of the circuit board; and
   a connection member that connects the optical element and the electronic element,
   wherein the glass rod has a connection portion of a curved shape between the upper surface and the lower surface,
   wherein the connection member is formed on the connection portion,
   wherein the connection member comprises:
      a transmission line, an entirety of the transmission line is curvedly formed along the curved shape of the connection portion of the glass rod; and
      a wire bonding unit that connects the electronic element and the optical element at both ends of the transmission line, the wire bonding unit is directly connected to both ends of the transmission line, and
   wherein the transmission line is directly formed in a pattern in the glass rod.

2. The optical module of claim 1, wherein the glass rod has a cross-sectional shape of a quarter of a circle.

3. The optical module of claim 1, wherein the optical element is formed in a direction opposite to that of the electronic element in the circuit board, and the glass rod is installed at a side surface of the circuit board.

4. The optical module 1, wherein the transmission line is directly formed in the pattern in the glass rod without separate mask production and using an infrared ray short pulse laser.

* * * * *